(12) United States Patent
Finegold

(10) Patent No.: US 11,080,479 B2
(45) Date of Patent: Aug. 3, 2021

(54) PERSONALIZED MULTIMEDIA MESSAGING SYSTEM

(71) Applicant: Plingo Media, Inc., Alpharetta, GA (US)

(72) Inventor: Jack Finegold, Alamo, CA (US)

(73) Assignee: Plingo Media, Inc., Alpharetta, GA (US)

(*) Notice: Subject to any disclaimer, the term of this patent is extended or adjusted under 35 U.S.C. 154(b) by 0 days.

(21) Appl. No.: 16/943,113

(22) Filed: Jul. 30, 2020

(65) Prior Publication Data

US 2021/0034811 A1 Feb. 4, 2021

Related U.S. Application Data

(60) Provisional application No. 62/881,068, filed on Jul. 31, 2019.

(51) Int. Cl.
| | |
|---|---|
| *G06F 40/186* | (2020.01) |
| *H04L 12/58* | (2006.01) |
| *H04L 29/08* | (2006.01) |
| *G06T 11/60* | (2006.01) |

(52) U.S. Cl.
CPC ........... *G06F 40/186* (2020.01); *G06T 11/60* (2013.01); *H04L 51/10* (2013.01); *H04L 67/02* (2013.01)

(58) Field of Classification Search
CPC .................................................... G06F 40/186
See application file for complete search history.

(56) References Cited

U.S. PATENT DOCUMENTS

| | | | |
|---|---|---|---|
| 7,865,394 B1* | 1/2011 | Calloway | ............. G06Q 10/107 705/14.4 |
| 10,200,323 B2* | 2/2019 | Guthery | .................. G10L 15/26 |

* cited by examiner

*Primary Examiner* — Roland J Casillas
(74) *Attorney, Agent, or Firm* — Bishop, Diehl & Lee, Ltd.

(57) ABSTRACT

A method and system for generating a personalized interactive multimedia message. A web tool or a mobile application is used to upload media to a streaming storage platform to create an enhanced interactive multimedia message. A media template suitable for customizing the enhanced interactive multimedia message is used to modify the enhanced interactive multimedia message to create a finalized enhanced interactive multimedia message, which is sent to a backend node instance. The node instance returns a URL that will render a viewable finalized enhanced interactive multimedia message which can be sent to an end recipient manually or automatically.

12 Claims, 16 Drawing Sheets

FIG. 21

PERSONALIZED MULTIMEDIA MESSAGING SYSTEM

RELATED APPLICATION

The present application claims the filing priority of U.S. Provisional Application No. 62/881,068, titled "Personalized Multimedia Messaging System" and filed on Jul. 31, 2019. The '068 application is hereby incorporated by reference.

TECHNICAL FIELD OF THE INVENTION

The present invention relates to software as a service (SaaS) cloud-based messaging platform. Specifically, the invention provides website, web tool, mobile apps and message delivery methods to create and send personalized interactive multimedia messages via any digital delivery method.

BACKGROUND OF THE INVENTION

In B2B (business-to-business), B2C (business-to-consumer), C2C (consumer-to-consumer) and P2P (peer-to-peer) communications, extending to all digital delivery methods (e.g. text, email, social media, other methods of delivery, etc.), there is a gap in the personalization piece of multi-media messaging based on limited multimedia content and storage concerns.

The limitation of digital messaging platforms currently allows for minimal personalization on multimedia messages based on limited content per message. Further, the messaging platforms send files like images or videos that are downloaded to a device (e.g., laptops, mobile phones, tablets, etc.) for the recipients to view. These other platforms provide text or images or video or stickers or emojis individually in a single message. Some of the more complex platforms combine text and images along with text segmented in the message. These platforms all send files that add to storage costs and upgrading devices to collect such media.

These other messaging platforms may provide a cloud-based tool but not cloud-based storage for media when rendering of media content on a device. Others may provide no cloud services with their applications (tools (mobile, laptop, tablet, etc.) to create and send a message). Thus, there is a need for a scalable platform that is cloud-based to provide a variety of products designed to generate personalized interactive multimedia messaging.

SUMMARY OF THE INVENTION

There is disclosed herein an improved interactive multimedia message system and method for generating the same which avoids the disadvantages of prior systems and methods while affording additional structural and operating advantages.

Generally speaking, the disclosed method for generating a personalized interactive multimedia message comprises the steps of providing at least one of either a web tool and a mobile application, accessing one of either the web tool and the mobile application, uploading media to a streaming storage platform to create an enhanced multimedia message, selecting a media template either manually or dynamically by the streaming storage platform, wherein the template is suitable for customizing the enhanced multimedia message, modifying the enhanced multimedia message to create a finalized enhanced interactive multimedia message, sending the finalized enhanced interactive multimedia message from one of either the web tool or the mobile application, including all pertinent configuration parameters, to a backend node instance, returning from the node instance a URL that will render a viewable finalized enhanced interactive multimedia message and sending the viewable finalized enhanced interactive multimedia message to an end recipient manually or automatically.

In specific embodiments, the method for generating a personalized interactive multimedia message further comprises the step of editing the enhanced interactive multimedia message and/or saving the finalized enhanced interactive multimedia message to a database instance.

In specific embodiments of the method for generating a personalized interactive multimedia message, the step of modifying the enhanced interactive multimedia message to create a finalized enhanced interactive multimedia message is automatic or manually performed.

Generally speaking, the disclosed system for generating a personalized interactive multimedia message comprises a website for hosting at least one instance of a web tool or the web tool can be decoupled from the website for private networks or a mobile application that is downloaded on mobile devices and used accordingly, wherein an enhanced interactive multimedia message is created via one of either the web tool or mobile application, a streaming storage platform including a media template suitable for customizing the enhanced interactive multimedia message, wherein the enhanced interactive multimedia message uploads to the streaming storage platform where the media template customizes the multimedia message either manually or automatically to create a finalized enhanced interactive multimedia message, a databased instance, wherein the finalized enhanced interactive multimedia message is saved, and a node instance configured to receive the finalized enhanced interactive multimedia message and return a URL which is generated containing a viewable enhanced interactive multimedia message to send to an end recipient.

In specific embodiments of the system for generating a personalized interactive multimedia message, the enhanced interactive multimedia message is edited by one of either the web tool and the mobile application. Further, the viewable enhanced multimedia message may be sent manually or automatically, to a single or multiple end recipients or posted to a social media platform.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings and appendices, embodiments thereof, from an inspection of which, when considered in connection with the following description, the subject matter sought to be protected, its construction and operation, and many of its advantages should be readily understood and appreciated.

FIG. 21 depicts an embodiment of an analytics table for the disclosed system.

DETAILED DESCRIPTION OF PREFERRED EMBODIMENTS

Figure 1:
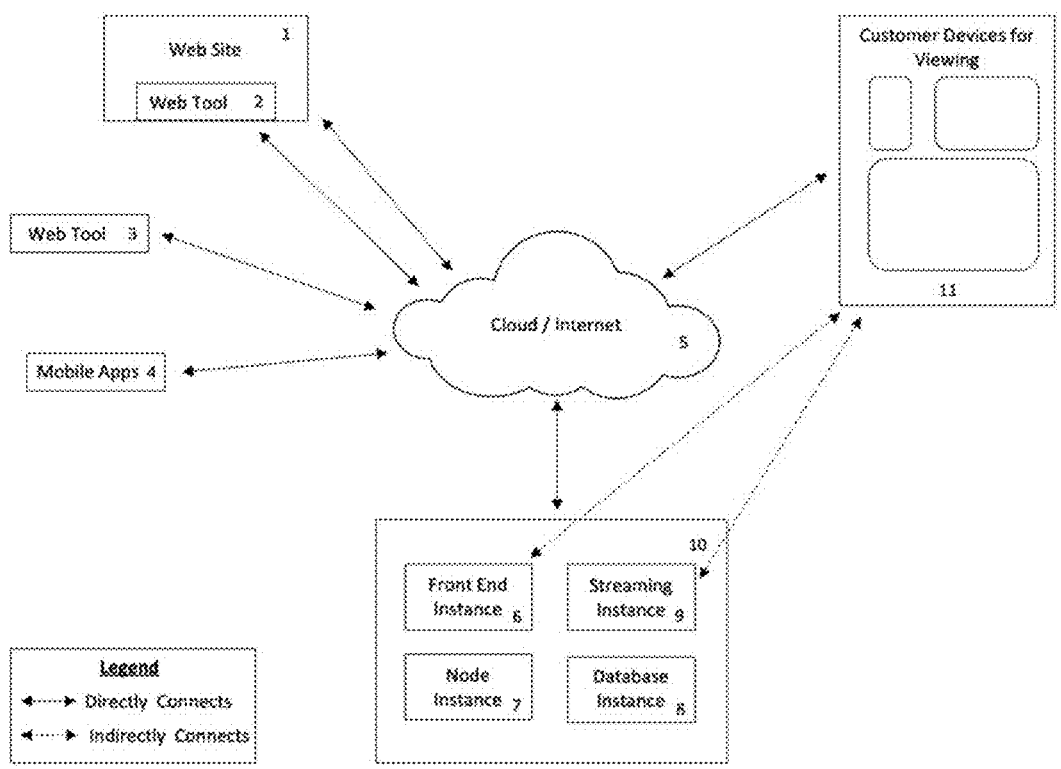
FIG. 1 is a schematic of an embodiment of a personalized multimedia messaging system.

While this invention is susceptible of embodiments in many different forms, there is shown in the drawings and appendices and will herein be described in detail at least one preferred embodiment of the invention with the understanding that the present disclosure is to be considered as an exemplification of the principles of the invention and is not intended to limit the broad aspect of the invention to any of the specific embodiments illustrated.

The present invention is directed to a personalized interactive multimedia messaging system, referred to herein as PLINGO™, an embodiment of which is shown in FIG. 1. This cloud-based messaging platform seeks to provide a solution to the problem(s) by providing a unique solution that provides a software as a service fully cloud-based platform to create enhanced interactive multimedia messages. Further, it provides the capability to attach a multimedia to a message by utilizing templates within the editing tools to combine multimedia content on a single layered screen. The media can be segmented and layered on the template and can have multiple pages with multiple templates providing more multimedia content.

The media content of the enhanced multimedia messages includes all media types (e.g., images, video, text, music/sound, etc.) contained within a single enhanced interactive multimedia message. The templates (static and dynamic segmentation of a device screen for viewing multimedia content) allow PLINGO™ users creating enhanced multimedia messages to use any media at their disposal to create personalized enhanced multimedia messages. The message is rendered in the cloud and the end viewer of the message would not receive any content downloaded to their device. The viewer receives a URL and clicks on the URL to view a cloud rendered enhanced multimedia message playable on any device. Unlike other messaging platforms, this unique platform dynamically and automatically renders via the URL and displays all multimedia content in one interactive message, a full cloud experience across all aspects of the platform. Further, this multimedia message can have virtual buttons (e.g., a button to click on with configurable hyperlink to specific event, website, polling buttons, form input buttons, etc.) added to capture information entered in polls and forms or redirect the user viewing the enhanced interactive multimedia message to another hyperlink.

FIG. 1 illustrates an embodiment of the multimedia interactive messaging system where the following reference numbers are used:
1. Website
2. Web Tool, hosted by and coupled to the website for use by any customer to create enhanced multimedia messages. The messaging module contained within the Web tool includes all forms of digital message delivery (e.g., text, email, social media, etc.)
3. Web Tool, decoupled from the website for private use and internal communications (i.e., behind a firewall) to create enhanced multimedia messages. The messaging module contained within the web tool includes all forms of digital message deliver (e.g., text, email, social media, etc.)
4. Mobile Apps, downloadable software for mobile devices to create enhanced multimedia messages
5. Cloud/Internet, host platform, private networks may use web tool on LAN/WAN
6. Front End Instance, logical instance for positioning multimedia content
7. Node instance—Logical operations, fundamental operations and insertion of artificial intelligence or self-correcting, self-optimizing, self-learning logic
8. Database Instance—Storage of all multimedia content combinations and features
9. Streaming Instance—Storage of all multimedia content
10. Cloud Servers, Storage and Logic
11. User Devices—Any user screen on any device supporting Internet browsers by any device manufacture.

Figure 2:
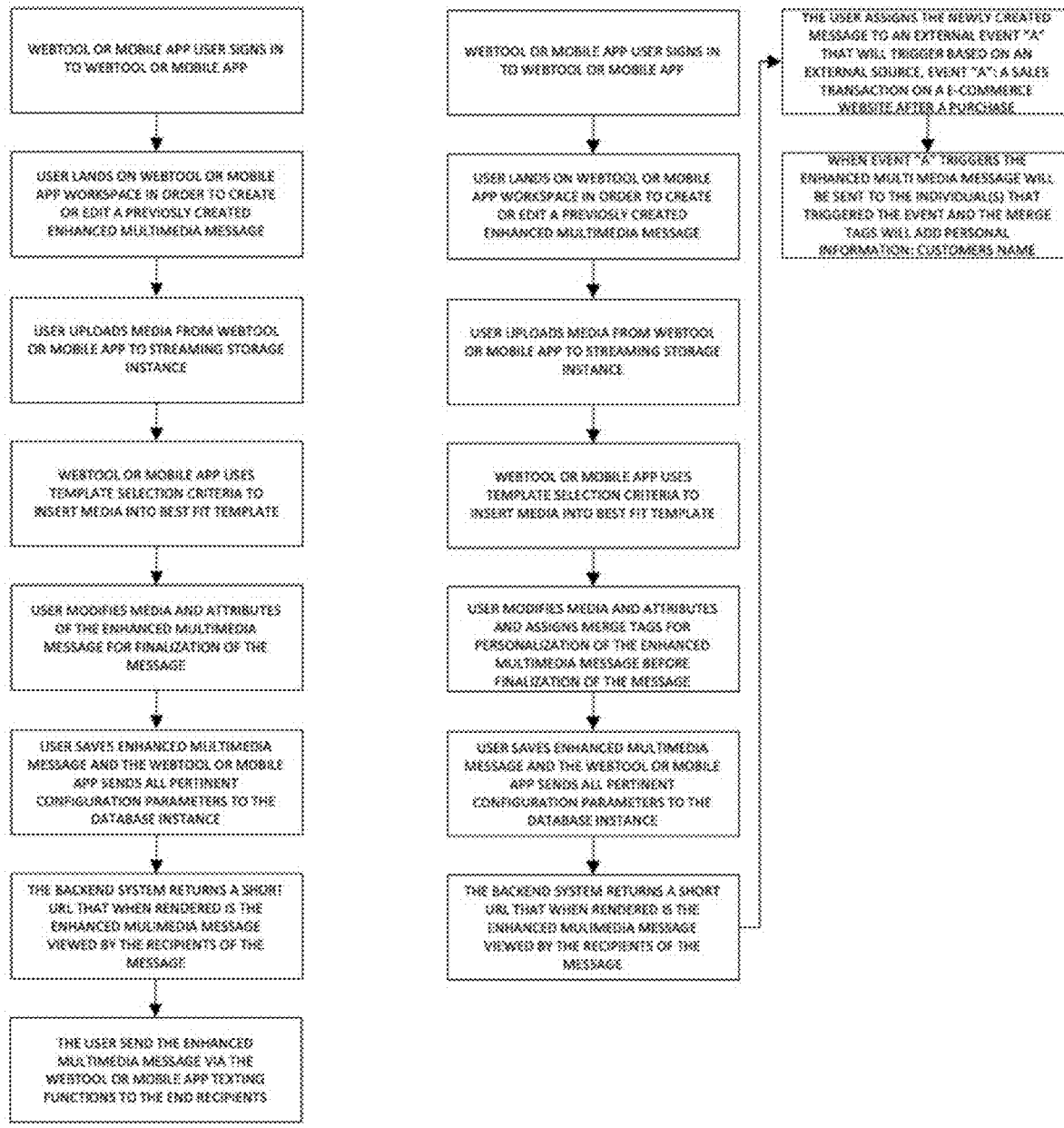
FIG. 2 is a process flow diagram of the enhanced interactive multimedia message creation (manual and automatic) of the present invention.
Figure 3:
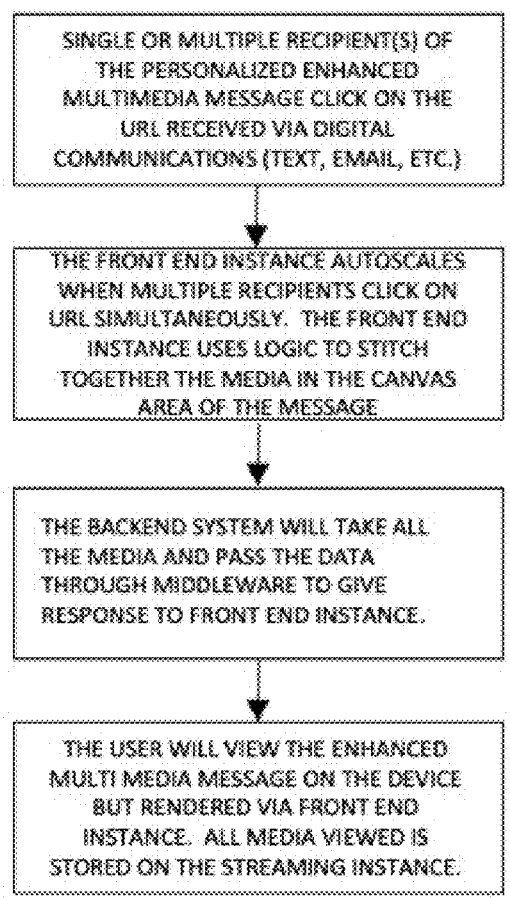
FIG. 3 is a process flow diagram for viewing a personalized interactive enhanced multimedia message of the present invention.
Figure 4:
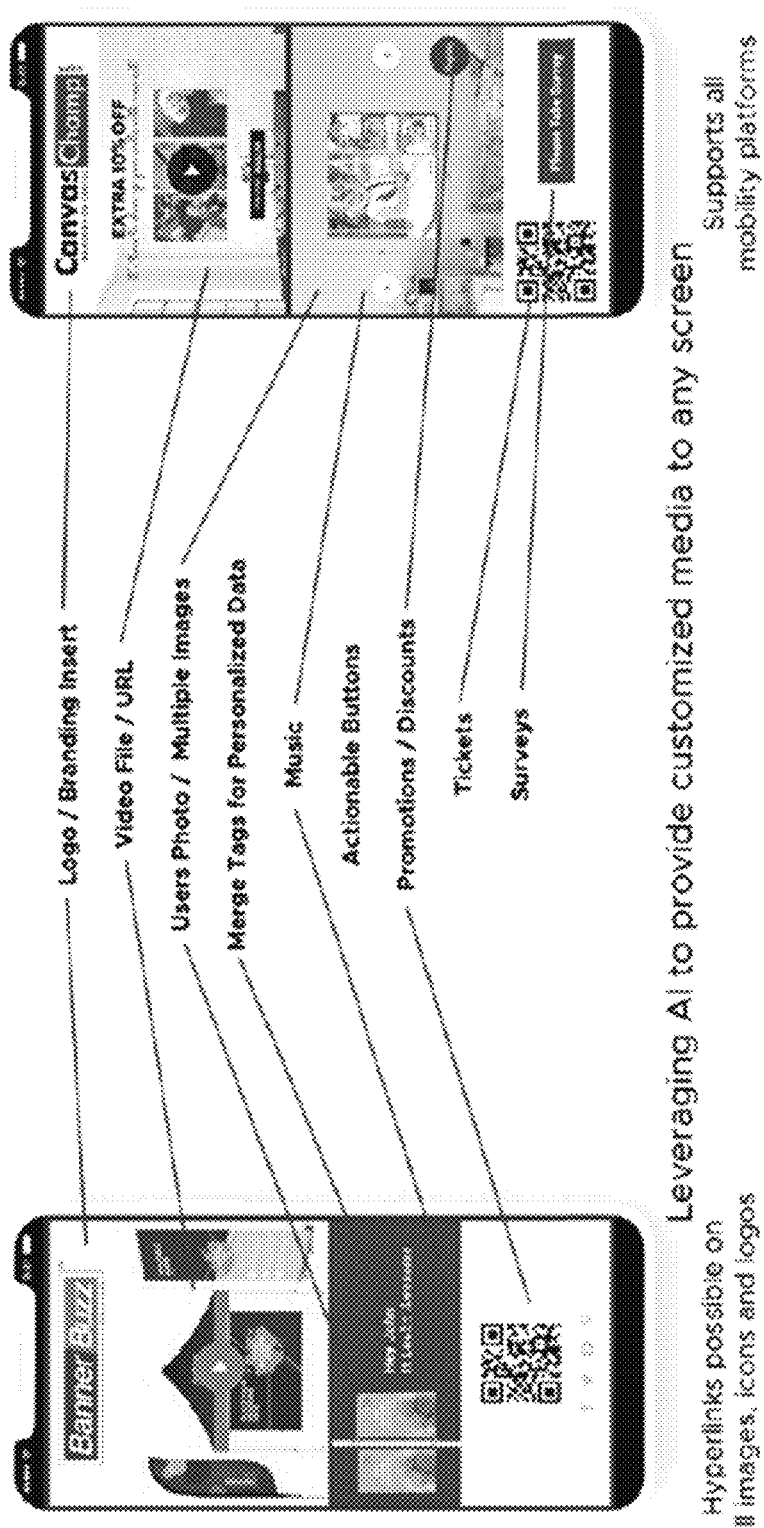
FIG. 4 is a depiction of an embodiment of the disclosed multimedia messaging system on a mobile device.
Figure 5:
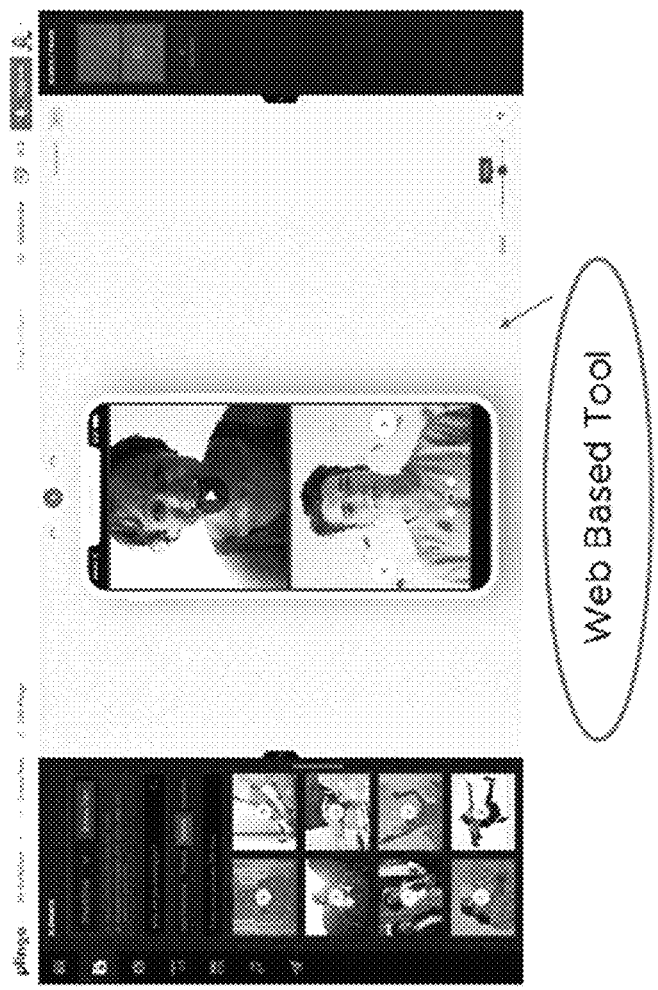
FIG. 5 is depiction of an embodiment of the web tool on a mobile device (left) and a website (right)
Figure 5:
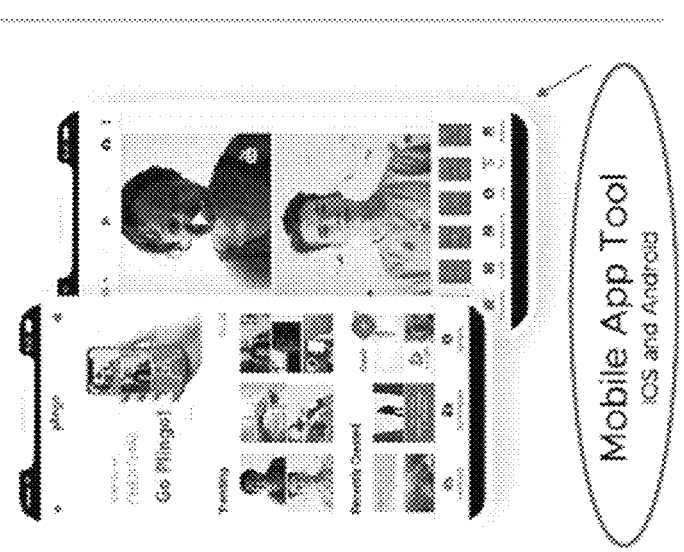

FIGS. 2 and 3 are process flow diagrams for creating and viewing enhanced interactive multimedia messages, which are discussed in detail below.

A. Manual Creation and Delivery of Enhanced Interactive Multimedia Message

The PLINGO™ user logs in to the PLINGO™ web tool or mobile app. The PLINGO™ user starts the creation of a PLINGO™ enhanced interactive multimedia message. The PLINGO™ user uploads the media content as instructed by the webtool or mobile app. The PLINGO™ user's multimedia content is stored in cloud storage and available for the customer to use anytime. The tool automatically and dynamically selects a template to use for the PLINGO™ enhanced interactive multimedia message. The selection of the PLINGO™ template in the tool is based on various criteria including but not limited to media quality, media type, most viewed PLINGO™ templates, etc.

The PLINGO™ user uses the PLINGO™ web tool or mobile app to edit or modify the multimedia content in the PLINGO™ template before creating the final PLINGO™ enhanced interactive multimedia message that will be sent to one or many recipients. The PLINGO™ user creates the PLINGO™ enhanced interactive multimedia message and sends via the messaging module of the PLINGO™ webtool or mobile app to one or many recipients.

The PLINGO™ enhanced interactive multimedia message is generated in the webtool and backend system. The result is a URL is generated that is sent back to the messaging module and included in the body of the message that is sent to one or more recipients. The URL can be sent via any digital delivery method (e.g. text, email, social media, etc.).

The recipient of the PLINGO™ enhanced interactive multimedia message will click on the URL and the multimedia message will render in the cloud and play on the recipient's device. The template and media are compiled in the backend system calling the media from streaming storage and pieces the contents in the template being displayed on the recipient's device.

B. Automatic Creation and Delivery of Enhanced Interactive Multimedia Message

The PLINGO™ business user has integrated the PLINGO™ cloud-based platform with the business e-Commerce site or with a corporate LAN/WAN. The PLINGO™ business user starts the creation of a PLINGO™ enhanced interactive multimedia message. The PLINGO™ business user uploads the media content as instructed by the webtool or mobile app. The PLINGO™ business user's multimedia content is stored in cloud storage and available for the customer to use anytime. The tool automatically and dynamically selects a template to use for the PLINGO™ enhanced multimedia message. The selection of the PLINGO™ template in the tool is based on various criteria including but not limited to media quality, media type, most viewed PLINGO™ templates, etc.

The PLINGO™ business user uses the PLINGO™ web tool or mobile app to edit or modify the multimedia content in the PLINGO™ template before creating the final PLINGO™ enhanced multimedia message that will be sent automatically to one or many recipients when an event is triggered on an e-Commerce site or in a backend system of a corporate LAN/WAN. The PLINGO™ user creates the PLINGO™ enhanced interactive multimedia message, associates the PLINGO™ enhanced interactive multimedia message to an e-Commerce or Corporate LAN/WAN event and sets to send via the messaging module of the PLINGO™ webtool or mobile app to one or many recipients when the event is triggered.

The PLINGO™ enhanced interactive multimedia message is generated in the webtool and backend system. The result is a URL generated and sent back to the messaging module to be included in the body of the message and sent to one or more recipients when an event is triggered. The URL is sent via a digital delivery method (e.g., text, email, social media, etc.).

The recipient of the PLINGO™ enhanced interactive multimedia message will click on the URL and the multimedia message will render in the cloud and play on the recipient's device. The template and media are compiled in the backend system calling the media from streaming storage and pieces the contents in the template being displayed on the recipient's device.

In both manually triggered and automatically event triggered PLINGO™ enhanced interactive multimedia messaging, the end recipient views a PLINGO™ message on their device that is customized to them. During the creation of the PLINGO™ message in the webtool and mobile apps, merge tags are utilized to automatically populate the PLINGO™ enhanced interactive multimedia message with personal information (e.g., name, product sold, etc.) retrieved from various database (e.g., customer information from registering).

C. Business Applications

The cloud-based solution is a scalable platform residing in the cloud that provides a variety of products designed to generate Personalized Interactive Multimedia Messaging automatically or manually depending on the application. This scalable, secure and feature rich platform is designed to provide instantaneous and on demand messaging capable of meeting any companies, long-term growth and messaging requirements.

Figure 6:
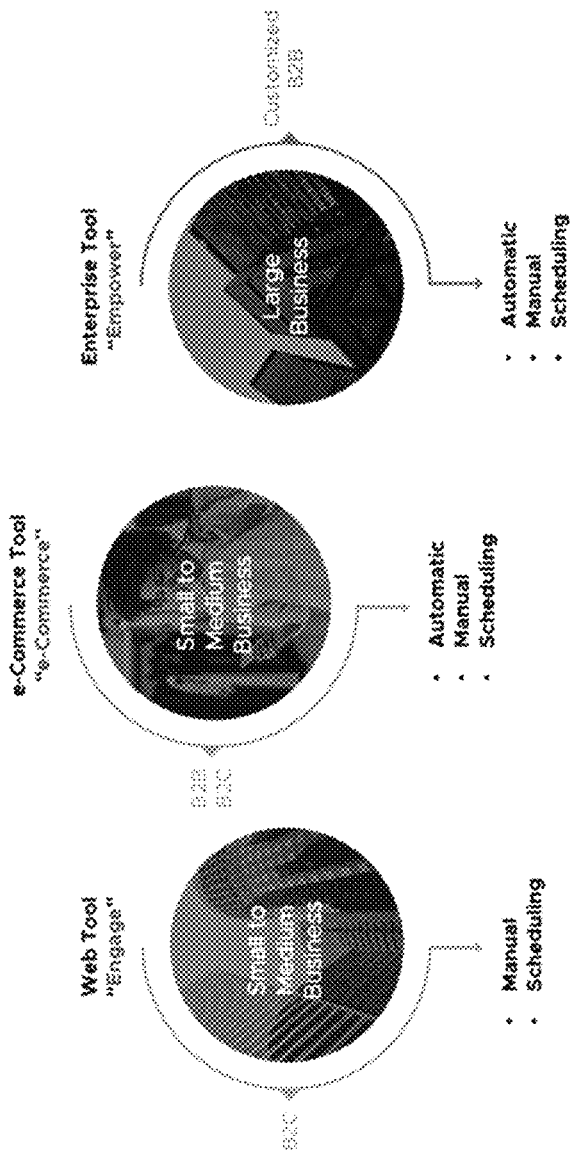
FIG. 6 is depiction of embodiments of three pre-scaled business products which can be available on the cloud-based platform.

As shown in FIG. 6, there are at least three pre-scaled business products which can be available on the cloud-based platform. The first is called "Engage" and is primarily for small to medium sized businesses. The "Engage" product requires no integration, as a customer simple logs-in and starts using the Webtool. A second, called "e-Commerce" is for small to medium business-commerce websites. The "e-Commerce" product requires minimal integration to customers e-Commerce website and the product will generate a PLINGO™ automatically based on an e-Commerce event. Finally, there is "Empower" for a customized enterprise solution-either Small Medium Business-Manual (SMB-M), or Small Medium Business-Automatic (SMB-A) and Customized Solution. The "Empower" product is for a large corporation or custom application that requires full custom integration and can be tailored to meet a broad and diverse set of customer communication demands.

Figure 7:
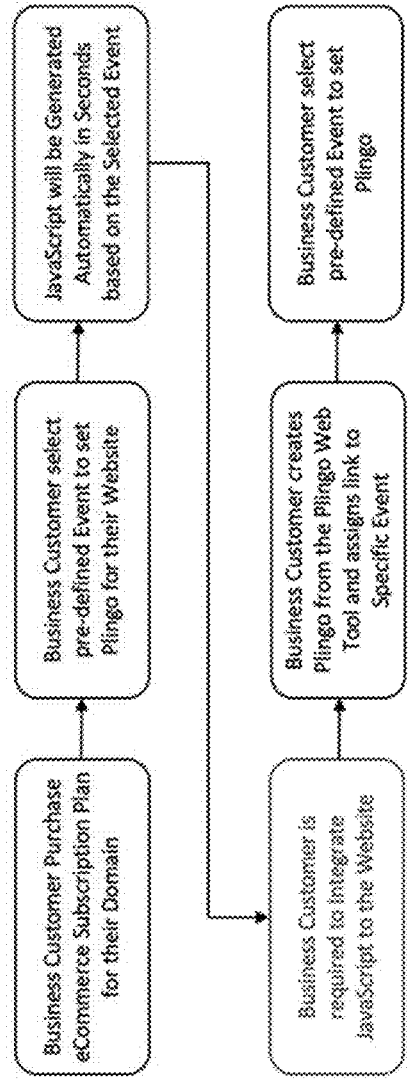
FIG. 7 is a simple process flow that the e-Commerce business customer may go through to setup the PLINGO™ Application on a specific e-Commerce Website.

FIG. 7 illustrates a simple process flow that the e-Commerce business customer may go through to setup the PLINGO™ Application on a specific e-Commerce Website. The fourth box (400) includes three options for the e-Commerce business customer to integrate the PLINGO™ Application with the e-Commerce website.

The first option is considered "Do It Yourself" (DIY) integration. This option may be used where an e-Commerce business customer has knowledge to integrate the script via web developer. The following is a sample script based on a "sign up" event.

<script data-siteid="XXXXXX" src="https://api.plingo.com/js/signup/XXXXX
XXXXX_222bSfb102Sa6f580288f22cbd29c1b c.js"
type="text/javascript"></script>

Option two is for the customer to contact tech support for integration. Some e-Commerce business customers may require some clarification during integration and may call tech support for some guidance. Finally, options three is when an e-Commerce customer does not know how to integrate the PLINGO™ Application into their website. This can be a managed service that is provided to the e-Commerce business customer.

Figure 8:
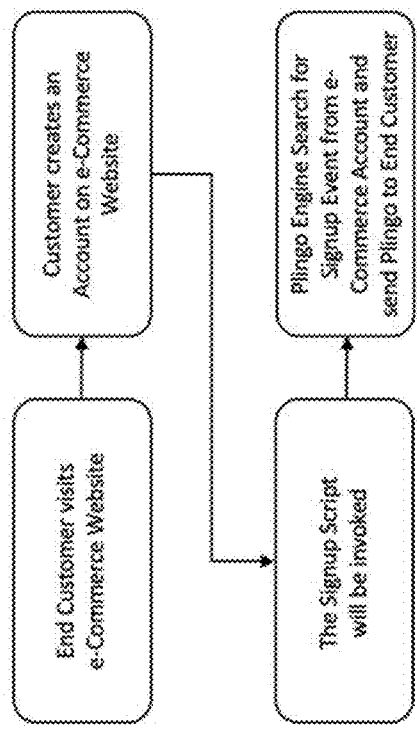
FIG. 8 is a simple flow diagram showing an embodiment of how an end customer may sign up on an e-Commerce website.

Once the application integration is complete, a simple flow process as shown in FIG. 8 will occur to allow an end customer to sign up on an e-Commerce website.

1. e-Commerce Product for e-Commerce Website

The e-Commerce product automatically sends PLINGO™ messages based on a triggered event. The business customer selects the template, content (i.e. multi-media content specific to the event) and merge tags (e.g. pointer to specific end customer data) and links to the e-Commerce event.

Figure 9:
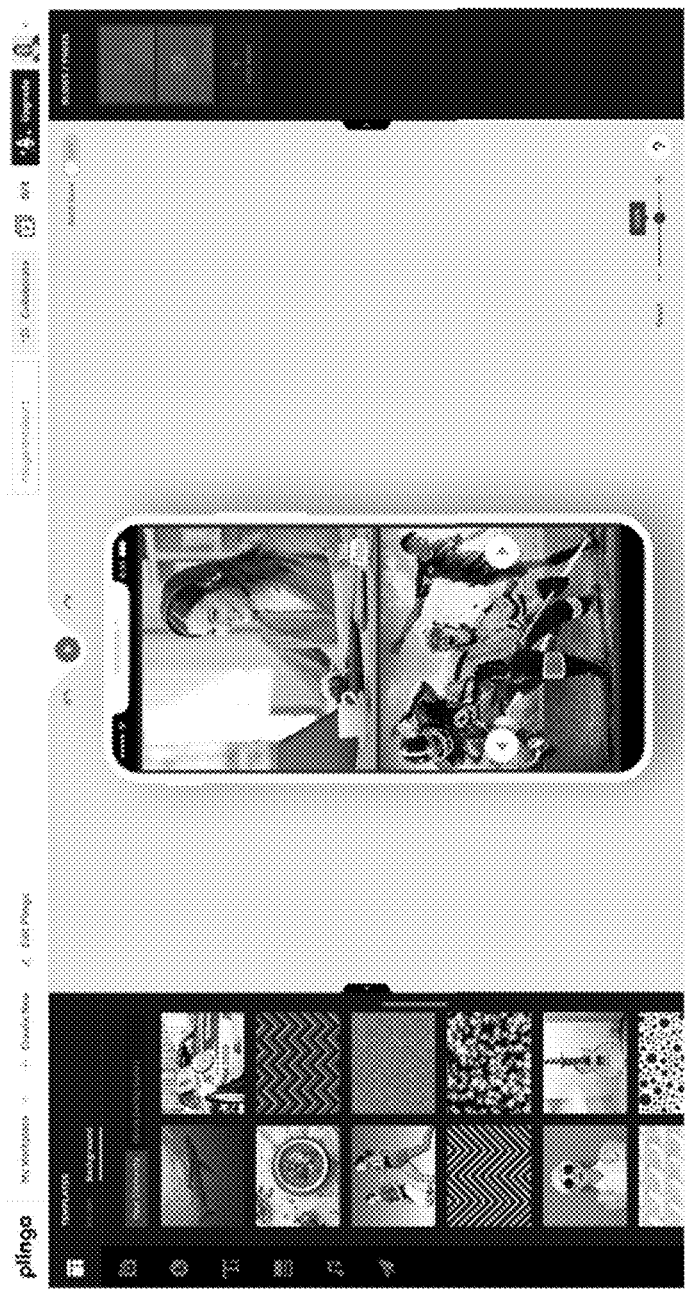
FIG. 9 depicts an embodiment of the e-Commerce business customer's Web Tool.

The business customer will login to the PLINGO™ Web Tool to complete the template selection, media selection and merge tags. FIG. 9 depicts an embodiment of the e-Commerce business customer's Web Tool.

The following e-Commerce events are common across all e-Commerce websites. The PLINGO™ application for e-Commerce can use these to trigger a PLINGO™ to be sent to the end customer. Depending on the e-Commerce business customer, the event may or may not be a high priority to trigger a PLINGO™. Each e-Commerce business will define the event needed based on their business need. Below is a non-exhaustive list of possible events:

Signup or Register Event—The Sign-up event is triggered when the end customer signs up or registers on an e-Commerce Website.

Newsletter Signup Event—The Event is triggered when an end customer clicks on the Signup for Newsletter box.

Order Event—End Customer completes a Purchase Transaction on an e-Commerce Website.

Order Shipped Event—A reminder PLINGO™ for Order and for Delivery (Order Shipped+Expected Delivery Date).

Quotation Event—In some e-Commerce Websites quotes can be generated and delivered to the customer via email.

Abandon Cart Event—Merchandise has been added to Cart and left for X amount of time.

Contact Enquiry Event—An End Customer has requested something

Submit Review Event—A follow up PLINGO™ for Review

Wish List Event—Product on wish list can be data mined and PLINGO™'s sent specific to the Product. This PLINGO™ is similar to an abandoned cart. The end customer has a wish list of products that they may purchase at a later date.

Custom Forms Event—How would an e-Commerce Business Customer Use This Event? For example, a thank you PLINGO™ might be sent to the End Customer requesting feedback on items that would improve the shopping experience.

2. Engage Product for Small Medium Business

Engage is a product that resides online within the Plingo.com website. Business Customers or Consumers will have the ability to create individual logins and have ongoing access to workspace. From this workspace, Engage users will have the ability to create, manage, store, and send their individually created PLINGO™ messages. All Engage users will have the ability to create or upload a list of customer contacts for the purpose of managing the delivery of PLINGO™ messages to individuals or groups of contacts. From here Engage users can define and input relevant customer details that may be used to send more personalized PLINGO™ messages such as birthdays, location, gender and even relevant historical criteria such as shopping preferences. These details can be accessed by merge tags that may be included for personalization to each end customer. (e.g. Hi {FNAME}). For this solution, Engage users may create these PLINGO™ message manually but have the ability to also schedule when each message gets sent (e.g. end customer birthday).

The Engage product is a manual product that can send messages immediately or schedule sending a message at a later time/date. With the web tool (see FIG. 9), the Engage user can select a template, content (i.e. multi-media content specific to the POS sales event) and merge tags (e.g. pointer to specific end customer data) for the specific PLINGO™ message.

Customers using the Engage product can benefit business in many ways including the following:

Increased Sales
Digital Marketing
Brand Name awareness
Sales promotions
Creation and Management of Loyalty program
Customer communication/newsletters Perhaps the most compelling use is for businesses to engage customers based on a loyalty program model or specific events (e.g. birthday, anniversary, sports events, etc.). The business customer can engage end customers with either a granular (i.e., one on one) personalized interactive message or with a specific broadcast (e.g., event based) to a group of contacts. These messages can be generated from a customer's contact list and can be personalized with merge tags.

Unlike the e-Commerce product, the Engage product messages are triggered manually or with set dates defined by the Engage user. An example, as described in greater detail below, is that the user creates a PLINGO™ manually, sets the contact list for the PLINGO™, sets the date that the PLINGO™ will be sent out and then shares the PLINGO™.

Figure 10:
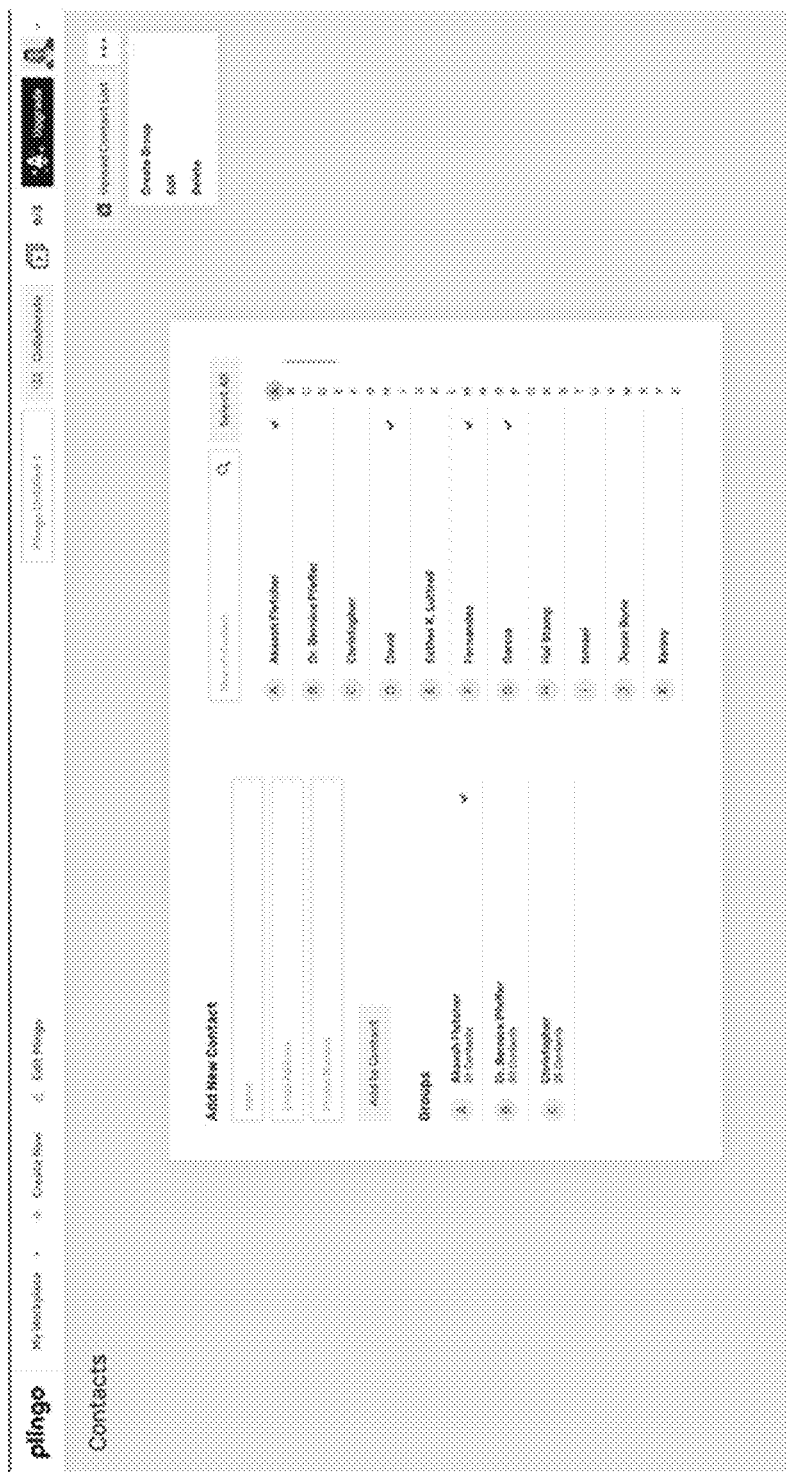
FIG. 10 depicts an embodiment of contact information which can be used by merge tags.

The Engage customer will upload an end customer contact list or enter the end customer contact individually. As shown in FIG. 10, the contact information can include end customer information, anniversary dates and other specific data to be use by merge tags.

Figure 11:
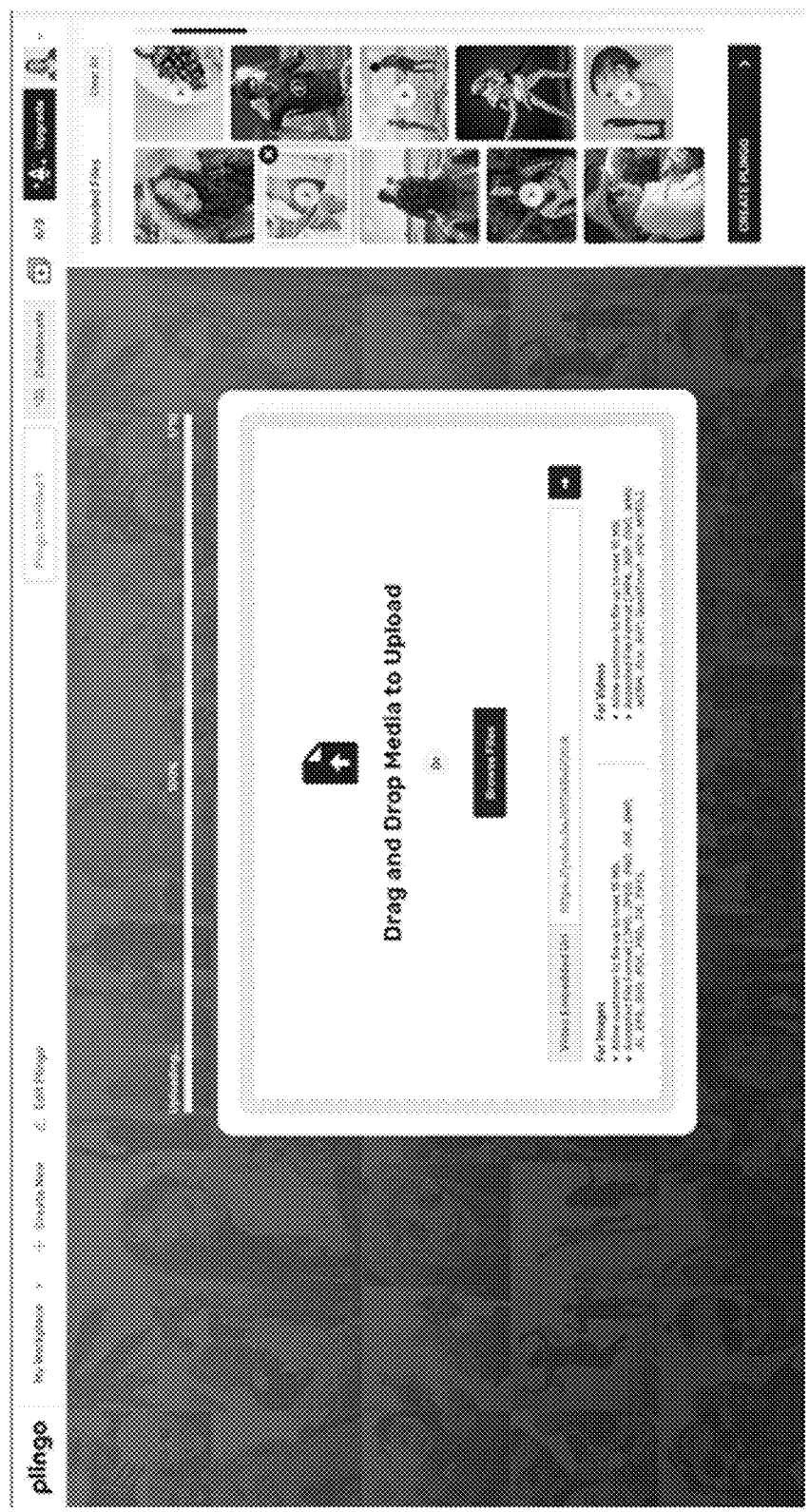
FIG. 11 depicts an embodiment of uploading media to a multimedia message.

As shown in FIG. 11, the Engage user is able to upload any media that they would use in their PLINGO™. Media can be uploaded anytime. Having specific stock photos or videos uploaded can help business customers manage PLINGO™ workspace.

Scheduling a broadcast PLINGO™ for customers can be achieved by using the birthday date contained in the contact list and scheduling the broadcast PLINGO™ at that time. It can also be scheduled by entering a date manually.

The contact list will contain specific information about each end customer. This information is called merge tags. For example, the end customer's name, birthday, anniversary, etc. may be contained in the contact list and accessed via a merge tag. A broadcast PLINGO™ that is send to a distribution of 50 end customers would send the same PLINGO™, but the merge tags would personalize the broadcast PLINGO™ to a specific end customer.

Figure 12:
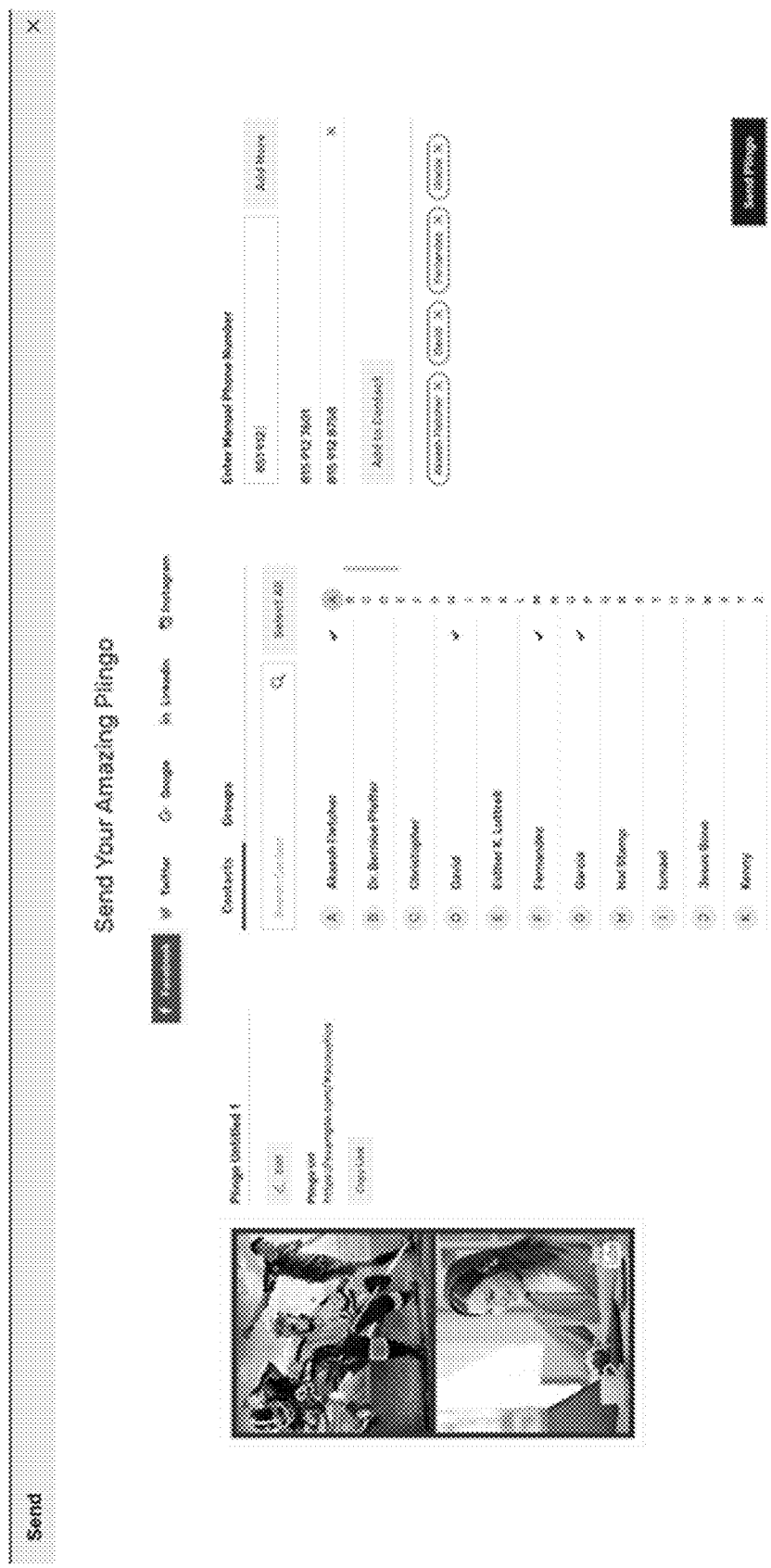
FIG. 12 depicts an embodiment of a multimedia message ready to send, which can be attached to social media or sent to individual contacts or a group of contacts.
Figure 13:
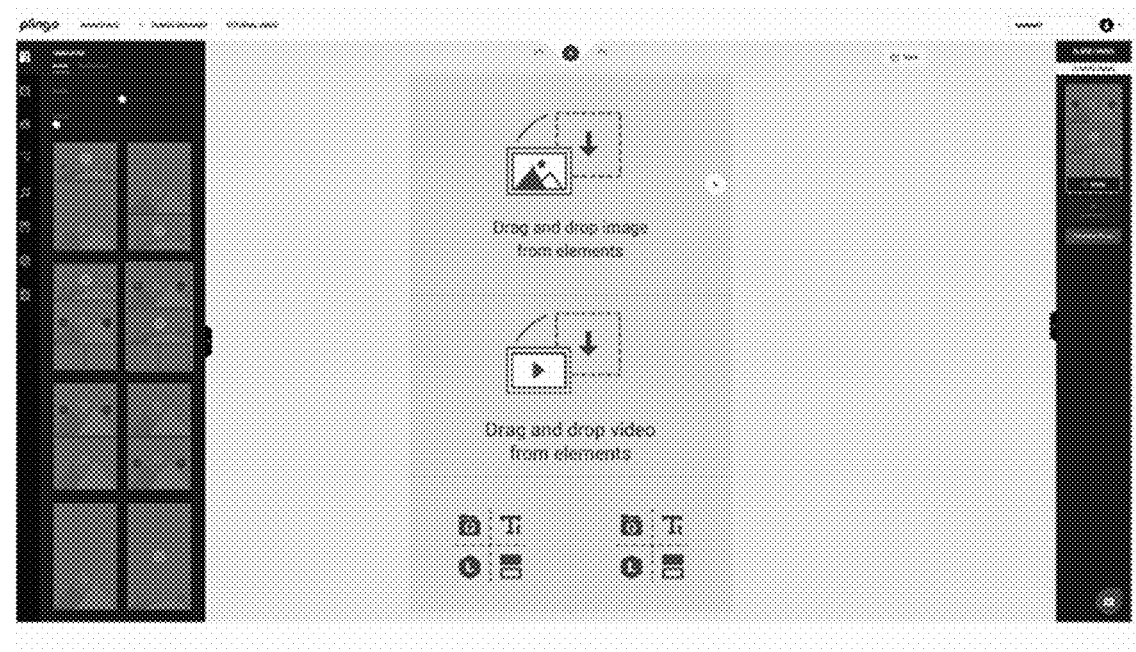
FIGS. 13 through 20 depict an embodiment of template driven formatting for interactive multimedia messaging.
Figure 14:
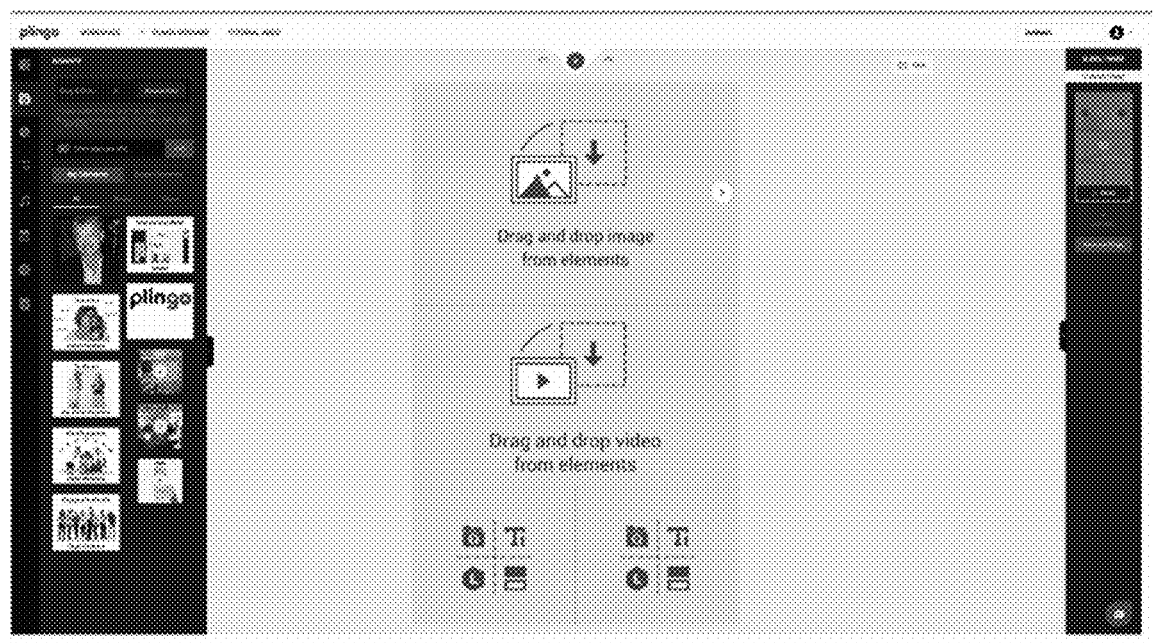
Figure 15:
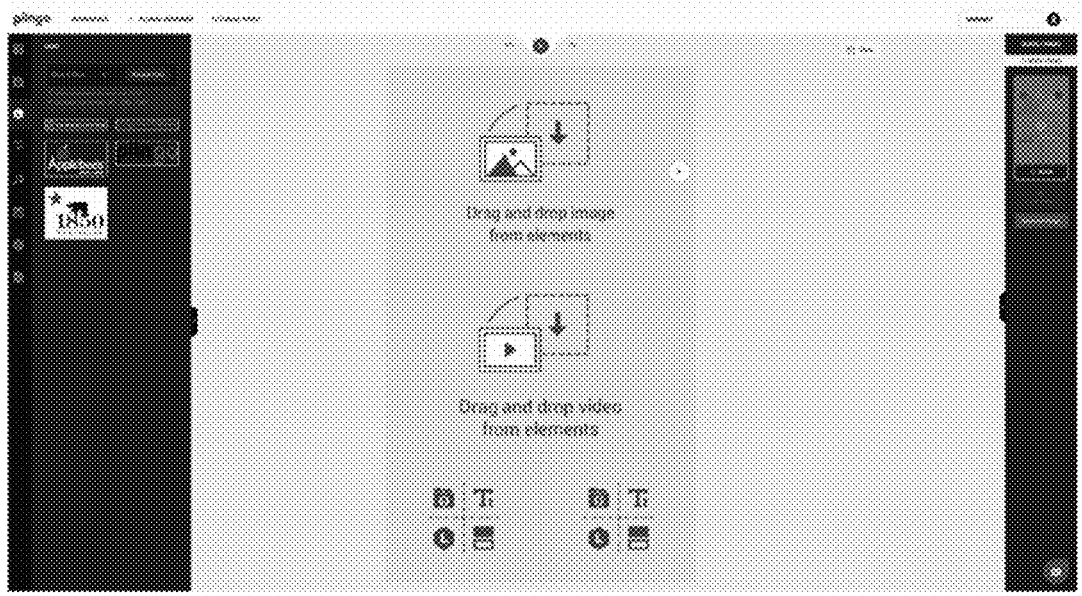
Figure 16:
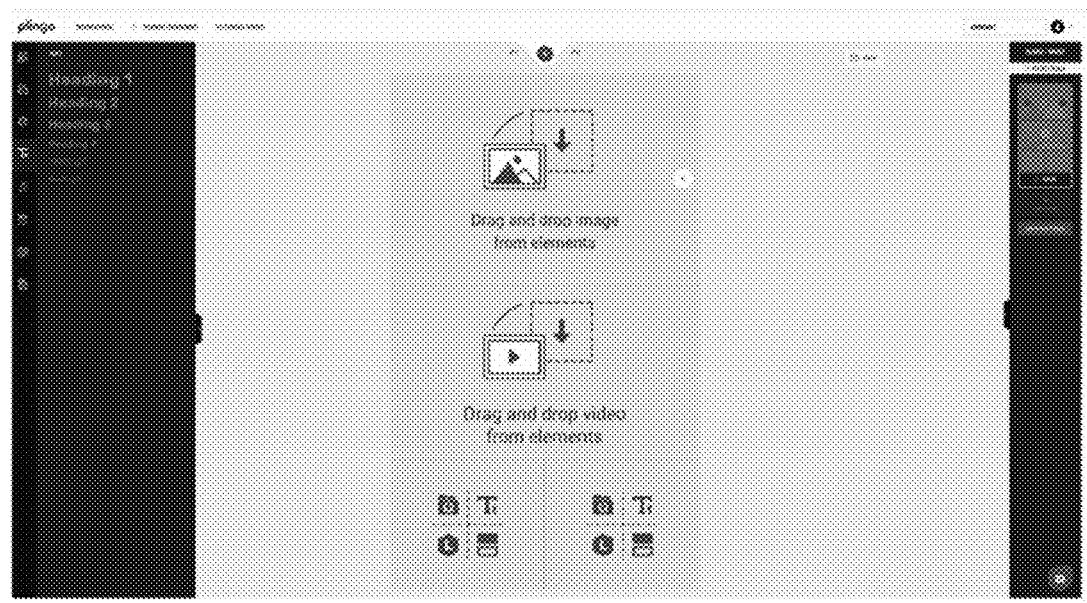
Figure 17:
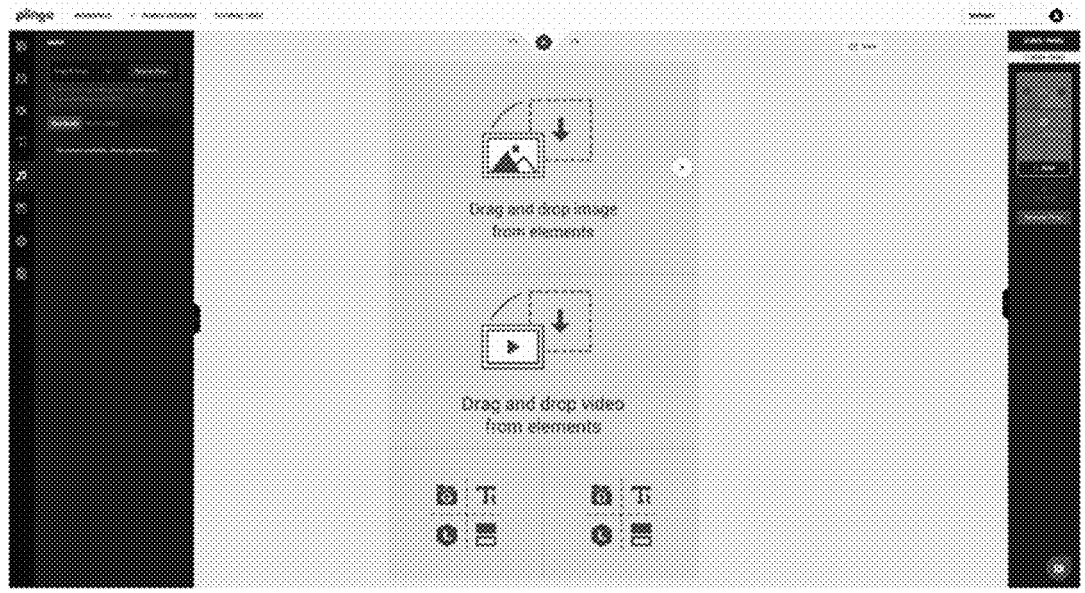
Figure 18:
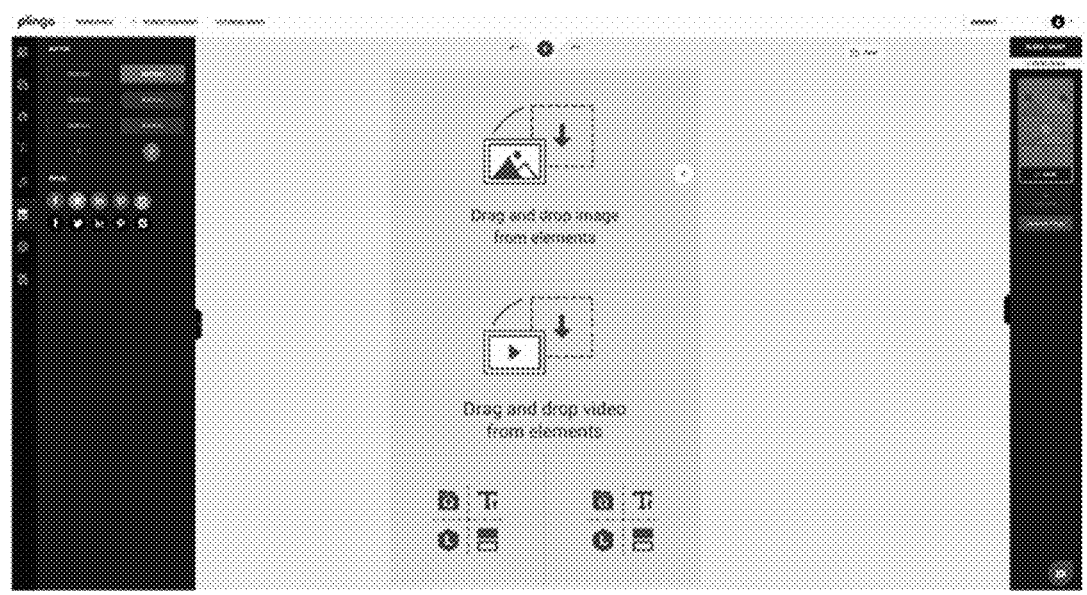
Figure 19:
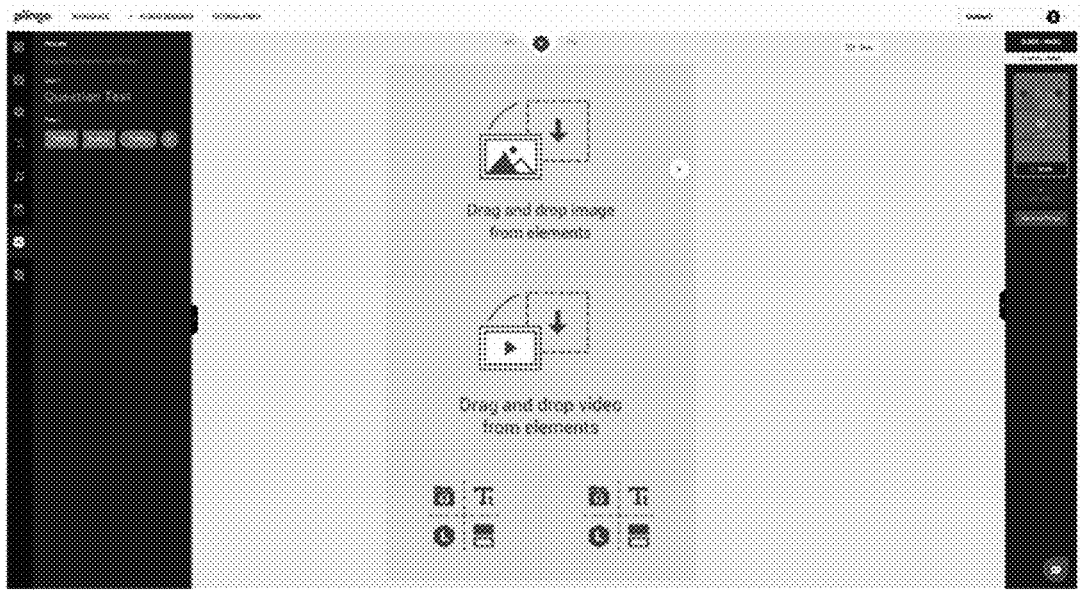
Figure 20:
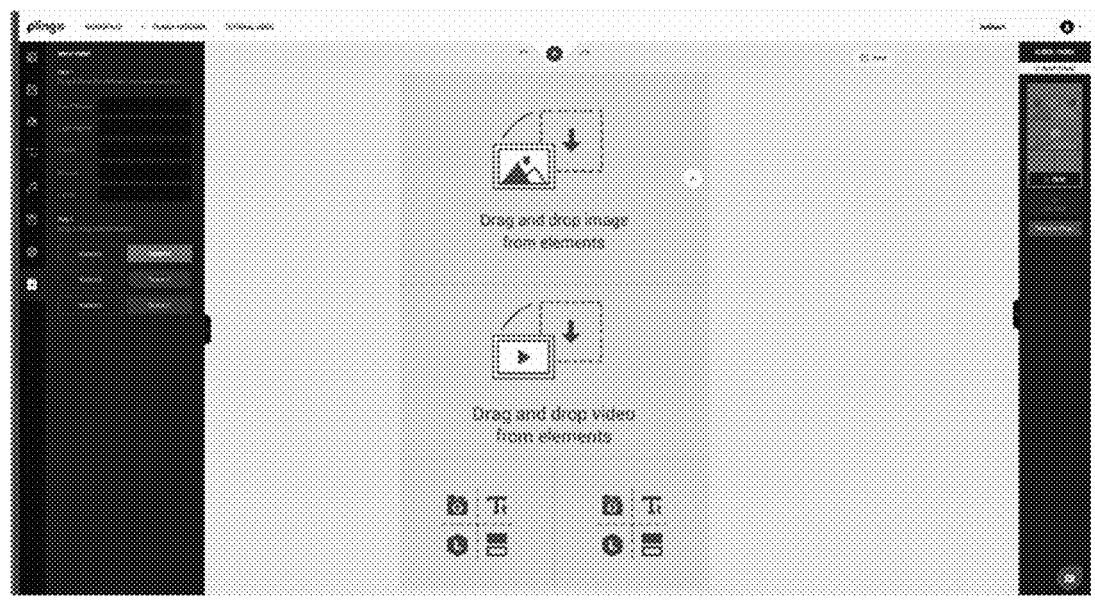

When the Engage customer has finished the PLINGO™ and is ready to send, they can attach to social media or send to individual contact or group of contacts, as shown in FIG. 12.

3. Empower Product for Large Business

The Empower Product may reside either online within the Plingo.com website or within the Enterprise customer premises behind a firewall. Empower users (or customers) will have the ability to choose how they leverage the tool as well as to what extent the tool is integrated in their back-office CRM, ERM, POS and accounting systems. All Empower customers will also have the ability to create, manage and deliver all their customer messages.

Customers using the Empower product may benefit businesses in many ways including the following:

Improved Internal Communications
Increased Sales
Digital Marketing
Brand Name awareness
Sales promotions
Customer communication/newsletters The Empower product is designed to provide large enterprise customers with a productivity tool capable of improving and solving a diverse range of business challenges. Empower operates the same as other PLINGO™ solutions, resides in the cloud and utilized all the same capabilities and feature sets. Unlike other PLINGO™ solutions, however, Enterprise is designed to be fully managed and operated by the end customer and will allow for instances to be integrated behind firewalls for internal communications.

Empower customers have the ability to manage all their own content including the creation, editing, managing and delivery of messages. Messages can be leveraged for any use case and used for any transactional, customer facing or internal use purposes.

Referring to FIGS. 13-20, the template driven formatting for interactive multimedia messaging is best illustrated. The following features are illustrated:

Drag and drop to the template

Automatic resizing and compression techniques to allow for larger files to right size to template media panes Company Logo logic to ensure correct pane is selected for Logo placement Text autofit based on what media pane is selected Music embedded in template during interactive message creation Playback logic embedded to ensure synchronization across media playback based on music length Media selection logic embedded to ensure layering of media during playback based on media selection. (e.g. video supersedes music) based on media playback timing and playback selection Interactive buttons allowing user to define "call to action" action seen by end customer during playback, such as URL, email, call back, text back, social media redirection Interactive buttons allowing user to define "call to action" action seen by end customer during playback, such as interactive polling Interactive buttons allowing user to define "call to action" action seen by end customer during playback, such as interactive form fills Further, there are unique analytics designed specifically for the PLINGO™ interactive message. PLINGO™ is a single URL and does not deviate off that URL when playing so traditional tracking of the PLINGO™ message cannot be handled by typical analytics engines that track websites through multiple URL clicks.

Figure 21:
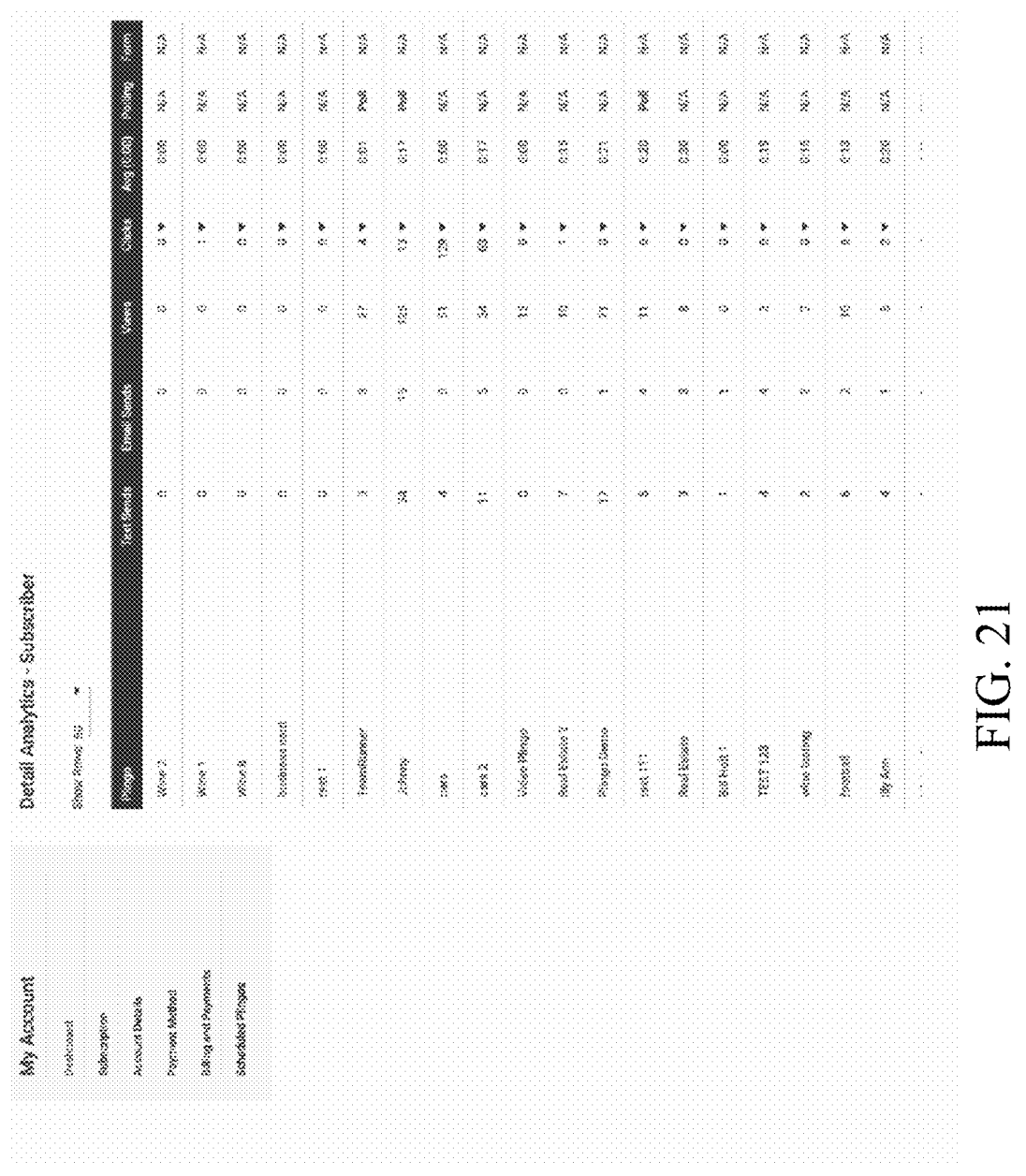

Based on above, an analytics engine has been developed to address all the various call to actions that redirect customers to other pages. As illustrated in FIG. 21, the analytics engine tracks any action (clicks) that an end customer takes when interacting with the PLINGO™ message. The analytic engines of the platform or system are capable of at least the following:

Track a redirection to a URL from any actionable buttons

Track a redirection to a social media platform from any actionable buttons

Track a call back from any actionable buttons

Track an email back from any actionable buttons

Track polling from the polling actionable buttons

Track form data from the form actionable buttons

Track enhanced interactive multimedia message play time

Track enhanced interactive multimedia message open rate

Using campaign IDs and Click IDs to align customer navigation based on the trackable instances with traditional analytics engines for a more granular analysis.

The platform also allows customers/users to embed post back URL for more detailed tracking when a customer deviates from the PLINGO™ URL (e.g. such as Click ID).

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicant's contribution. The actual scope of the protection sought is intended to be defined in the following claims when viewed in their proper perspective based on the prior art.

What is claimed is:

1. A method for generating a personalized interactive multimedia message, the method comprising the steps of:
   providing at least one of either a web tool and a mobile application;
   accessing one of either the web tool and the mobile application;
   uploading media to a streaming storage platform to create an enhanced multimedia message;
   selecting a media template either manually or dynamically by the streaming storage platform, wherein the template is suitable for customizing the enhanced multimedia message;
   modifying the enhanced multimedia message to create a finalized enhanced multimedia message;
   sending the finalized enhanced multimedia message from one of either the web tool or the mobile application, including all pertinent configuration parameters, to a backend node instance;
   returning from the node instance a URL that will render a viewable finalized enhanced multimedia message; and
   sending the viewable finalized enhanced interactive multimedia message to an end recipient manually or automatically.

2. The method for generating a personalized interactive multimedia message as set forth in claim 1, further comprising the step of editing the enhanced interactive multimedia message.

3. The method for generating a personalized interactive multimedia message as set forth in claim 1, further comprising the step of saving the finalized enhanced interactive multimedia message to a database instance.

4. The method for generating a personalized interactive multimedia message as set forth in claim 1, wherein the step of modifying the enhanced interactive multimedia message to create a finalized enhanced multimedia message is automatic.

5. The method for generating a personalized interactive multimedia message as set forth in claim 1, wherein the step of modifying the enhanced interactive multimedia message to create a finalized enhanced multimedia message is performed manually.

6. The method for generating a personalized interactive multimedia message as set forth in claim 1, wherein the step of providing at least one of either a web tool and a mobile application comprises accessing a website hosting at least one of either a web tool and a mobile application.

7. The method for generating a personalized interactive multimedia message as set forth in claim 1, wherein the webtool comprises a decoupled instance of the webtool from a private network.

8. A system for generating a personalized interactive multimedia message, the system comprising:
   a website for hosting at least one of a web tool, a mobile application and a decoupled web tool for private networks, wherein an enhanced interactive multimedia message is created via one of either the web tool or mobile application;
   a streaming storage platform including a media template suitable for customizing the enhanced interactive multimedia message, wherein the enhanced interactive multimedia message uploads to the streaming storage platform where the media template customizes the multimedia message either manually or automatically to create a finalized enhanced interactive multimedia message;

a databased instance, wherein the finalized enhanced interactive multimedia message is saved; and a node instance configured to receive the finalized enhanced multimedia message and return a URL which is generated containing a viewable enhanced interactive multimedia message to send to an end recipient.

9. The system for generating a personalized multimedia message as set forth in claim 8, wherein the enhanced interactive multimedia message is edited by one of either the web tool and the mobile application.

10. The system for generating a personalized multimedia message as set forth in claim 8, wherein the system has a zero customer impact error correction capability that allows any edits to an existing enhanced interactive multimedia message already sent to be done and the changes will be reflected in any enhanced interactive multimedia message in real time without further interaction with an end recipient.

11. The system for generating a personalized interactive multimedia message as set forth in claim 8, wherein the viewable enhanced interactive multimedia message is sent automatically.

12. The system for generating a personalized interactive multimedia message as set forth in claim 11, wherein the viewable enhanced interactive multimedia message is sent to a plurality of end recipients.

\* \* \* \* \*